(12) United States Patent
Fischer

(10) Patent No.: US 11,970,132 B2
(45) Date of Patent: Apr. 30, 2024

(54) PYROTECHNIC TIGHTENING DEVICE FOR A SAFETY BELT OF A SAFETY BELT UNIT HAVING A FORCE-LIMITING UNIT

(71) Applicant: Autoliv Development AB, Vargarda (SE)

(72) Inventor: Christian Fischer, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 456 days.

(21) Appl. No.: 17/273,489

(22) PCT Filed: Aug. 26, 2019

(86) PCT No.: PCT/EP2019/072698
§ 371 (c)(1),
(2) Date: Mar. 4, 2021

(87) PCT Pub. No.: WO2020/052948
PCT Pub. Date: Mar. 19, 2020

(65) Prior Publication Data
US 2021/0339702 A1   Nov. 4, 2021

(30) Foreign Application Priority Data

Sep. 10, 2018  (DE) ...................... 10 2018 121 999.7

(51) Int. Cl.
*B60R 22/46*          (2006.01)
(52) U.S. Cl.
CPC .. *B60R 22/4628* (2013.01); *B60R 2022/4642* (2013.01)

(58) Field of Classification Search
None
See application file for complete search history.

(56) References Cited

U.S. PATENT DOCUMENTS 3,749,360 A * 7/1973 Leimbach .............. B65D 83/46
                                                   251/348
4,811,882 A * 3/1989 Steeves ................... B25C 1/008
                                                   227/8

(Continued)

FOREIGN PATENT DOCUMENTS

DE        102009030215 A1 * 12/2010 ......... B60R 22/4628
DE     10 2009 051 451 A1    5/2011
(Continued)

*Primary Examiner* — David E Allred
(74) *Attorney, Agent, or Firm* — DICKINSON WRIGHT PLLC

(57) ABSTRACT

A pyrotechnic tightening device 1 of a safety belt unit having a force limiting unit, comprising—a gas generator, and—a piston 19, which is guided in a pipe and which closes a pressure chamber inside the pipe, wherein—a pressure can be applied to the pressure chamber by the gas generator, and—the piston can be driven by the pressure present in the pressure chamber to perform a tightening movement which can be transmitted by means of a force transmitting unit to the safety belt, wherein—the piston is formed in two parts consisting of a main body and a contact part arranged on the side of the main body facing the force transmitting unit, wherein—the contact part has a greater strength than the main body, wherein—the main body surrounds the contact part form fittingly at the end face facing the force transmitting device.

8 Claims, 3 Drawing Sheets

(56) References Cited

U.S. PATENT DOCUMENTS

| | | | |
|---|---|---|---|
| 5,878,936 A * | 3/1999 | Adachi | B25C 1/041 |
| | | | 227/130 |
| 6,345,504 B1 | 2/2002 | Takehara et al. | |
| 7,146,824 B2 * | 12/2006 | Ohno | F16K 1/482 |
| | | | 251/88 |
| 8,684,413 B2 * | 4/2014 | Schmidt | B60R 22/4628 |
| | | | 297/480 |
| 2004/0055641 A1 * | 3/2004 | Ostrowiecki | F16K 17/0413 |
| | | | 137/223 |
| 2005/0247531 A1 * | 11/2005 | Oota | F16F 9/58 |
| | | | 188/322.19 |
| 2010/0181408 A1 * | 7/2010 | Suhr | B60R 22/4628 |
| | | | 242/374 |
| 2011/0140502 A1 * | 6/2011 | Shiotani | B60R 22/4633 |
| | | | 297/475 |
| 2012/0006925 A1 * | 1/2012 | Burrow | B60R 22/4628 |
| | | | 242/374 |
| 2012/0211578 A1 * | 8/2012 | Fischer | B60R 22/1954 |
| | | | 242/374 |
| 2022/0349503 A1 * | 11/2022 | Durieux | F16L 37/40 |
| 2023/0158528 A1 * | 5/2023 | Lafosse | B05B 11/1047 |
| | | | 222/401 |

FOREIGN PATENT DOCUMENTS

| | | | | |
|---|---|---|---|---|
| DE | 102012214936 A1 | | 2/2014 | |
| DE | 102018100605 B3 * | | 3/2019 | ......... B60R 22/1954 |
| EP | 2563626 A1 | | 3/2013 | |
| EP | 3059127 A1 | | 8/2016 | |
| GB | 2432399 A * | | 5/2007 | ......... B60N 2/42763 |
| WO | 2009124664 A1 | | 10/2009 | |
| WO | 201150904 A1 | | 5/2011 | |
| WO | 2011/134574 A1 | | 11/2011 | |
| WO | WO-2011134567 A1 * | | 11/2011 | ......... B60R 22/4628 |
| WO | 2017001585 A1 | | 1/2017 | |
| WO | WO-2017021494 A1 * | | 2/2017 | |

\* cited by examiner

PYROTECHNIC TIGHTENING DEVICE FOR A SAFETY BELT OF A SAFETY BELT UNIT HAVING A FORCE-LIMITING UNIT

CROSS-REFERENCE TO RELATED APPLICATIONS

This application is a 35 U.S.C. § 371 national phase of PCT International Application No. PCT/EP2019/072698, filed Aug. 26, 2019, which claims the benefit of priority under 35 U.S.C. § 119 to German Patent Application No. 10 2018 121 999.7, filed Sep. 10, 2018, the contents of which are incorporated herein by reference in its entirety.

FIELD

The invention relates to a pyrotechnic tightening device for a safety belt of a safety belt unit, comprising a force-limiting unit having the features of the preamble of claim 1.

BACKGROUND

In principle, tightening devices of the generic type have the problem that the pressure conditions in the tightening device change very significantly during the tightening process. Very high pressure peaks in particular can lead to parts of the tightening device being damaged or the movement sequence of the tightening device being interrupted. Furthermore, there is the problem that the belt pull-out force at the beginning of the force-limited webbing pull-out movement following the tightening process increases briefly to a higher force-limiting level defined by the force-limiting device as a result of the pressure still prevailing in the tightening device. This effect is also generally referred to as a force-limiting interruption. To avoid these disadvantages resulting from the excessive pressure, various solutions have already been provided for avoiding pressure peaks and reducing the pressure as quickly as possible after the tightening of the safety belt has taken place.

A pyrotechnic tightening device with a piston cylinder unit is known from U.S. Pat. No. 6,345,504 B1, in which the piston is formed by an elastic ball with a blind hole, and a through-hole is provided in a subsequent ball through which a rod held in the blind hole projects. When excessive pressure occurs, the rod causes the elastic ball to break to allow the gas to escape through the channel. Both the production of the blind hole and the production of the through-hole and the rod are expensive and require a complex assembly process which further increases the cost of the tightening device.

DE 10 2009 051 451 A1 also discloses a pyrotechnic tightening device which has a piston drive in which a piston with a notch arranged in the lateral edge surface of the piston is provided. The notch is closed at the beginning of the tightening movement or alternatively has only a very small opening cross section, and is opened or expanded by the prevailing pressure and the flow conditions. As a result, a greater tightening power is transmitted at the beginning of the tightening movement and the prevailing pressure, or the acting tightening force is reduced more rapidly toward the end of the tightening movement by opening or expanding the notch.

It is further known from DE 10 2012, 214, 936 A1 to design the notch in two stages with a first section having a small opening cross section and a second section having a closed opening cross section, and to provide a partition which is arranged between the second section and the first section and is dimensioned such that it ruptures under the prevailing pressure conditions during the tightening movement and/or is at least partially removed by material removal. The sections of the notch are separated from one another by a partition so that a flow through the second section with the larger flow cross section is not possible in the initial phase of the tightening movement. The partition wall thus prevents a pressure reduction through the second section of the notch in an initial phase of the tightening movement, and the tightening power is deliberately not reduced. Only by the rupturing of the partition or by the removal of the partition wall material is a flow through the second section from the first section possible, thereby increasing the flow cross section available for pressure reduction, so that the pressure reduction is increased successively, or abruptly and the prevailing tightening force at the end of the tightening movement is deliberately reduced. At the same time, the pressure after the rupture of the partition or the removal of the partition is reduced much faster so that the force-limiting interruption at the beginning of the force-limiting phase is as low as possible. Moreover, the overall tightening power at the beginning of the tightening movement is not disadvantageously reduced by the later rupture or removal of the partition.

It is also known from WO 2011/134574 A1 to design the piston in two parts consisting of a main body and a contact part for transmitting the tightening movement, wherein the contact part should intentionally have a greater strength than the main body for transmitting the tightening force. The notches and the through-opening to be opened are provided in the main body which realizes the sealing function of the piston.

SUMMARY

The aim of the invention is to provide a pyrotechnic tightening device for a safety belt of a safety belt unit having a force-limiting unit with further improved transmission of the tightening force.

The object of the invention is achieved by a pyrotechnic tightening device for a safety belt of a safety belt unit having a force-limiting unit with the features of claim 1. Further preferred embodiments of the invention can be found in the dependent claims, the figures and the associated description.

According to the basic idea of the invention, it is proposed that the main body encompasses the contact part in a form-fit at the end face facing the force-transmitting device. The proposed solution strengthens the bonding of the two-part piston with the main body and the contact part. The contact part is thus fixed to the main body, and the probability that the contact part will disengage from the main body can be reduced. This is advantageous in particular when guiding the piston in a curved pipe since complex transverse forces act on the piston due to the curvature of the pipe. In the previously known solution, said complex transverse forces can lead in a worst case scenario to the contact part disengaging from the main body and becoming jammed between the main body and the inner wall of the pipe, as a result of which the tightening movement can in turn be interrupted. The proposed form-fitting connection additionally secures the contact part to the main body. Moreover, the main body encompasses the contact part on its outside and thereby prevents the piston from coming into contact with the inner wall of the pipe by the contact part instead of by the main body. The sealing and guiding function of the piston on the inner wall of the pipe is thus realized exclusively by the main body, while the contact part is exclusively used to transmit the tightening forces to the force-transmitting device.

It is further proposed that the main body has an annular protruding collar which has at least one projection that is directed radially inward with which it encompasses the contact part in a form-fitting manner. The collar forms the form-fitting connection by means of the projection that is directed radially inward, and at the same time separates the contact part from the inner wall of the pipe by laterally projecting beyond the contact part. The annular collar practically forms a seat at the end face of the main body facing the force-transmitting device in which the contact part is arranged.

It is further proposed that the annular collar is interrupted in a circumferential direction by at least one recess. The annular collar is deliberately weakened by the recess, so that the collar with the edge sides adjoining the recess can spring outwards when the contact part is pressed in. The collar is practically deliberately subdivided by the recesses into two or more resilient sections, by means of which the mounting of the contact part in the seat created by the collar is facilitated. Furthermore, the resilient design of the collar created in this way facilitates the guiding of the piston in the curved sections of the pipe since the collar can thereby adapt better to the curvature of the pipe.

It is further proposed that the main body has, in its lateral surface, at least one groove aligned in the longitudinal direction of the piston and opening into the pressure chamber. The advantage of the proposed solution is that the pressure from the pressure chamber can be dissipated through the groove when pressure peaks occur since the gas is able to flow out of the pressure chamber through the groove past the piston to the side of the force-transmitting device.

A constriction that narrows the cross-sectional area stepwise can preferably be provided in the groove. The overflow cross-section of the groove is narrowed by the constriction so that the tightening power is reduced as little as possible. In the event of an overflow of the gas, the constriction can then be widened by erosion of the main body in the region of the edges of the constriction until it has the maximum cross-sectional shape of the groove.

In this case, the constriction can preferably be arranged on an edge side of the main body adjacent to the pressure chamber so that it has maximum exposure to the pressure of the pressure chamber.

Furthermore, the constriction can preferably be arranged in a web extending transversely to the groove and closing the groove. The web closing the groove ensures that, in an initial phase, the gas can flow past the piston exclusively through the constriction so that the tightening power is reduced as little as possible. The web then acts as a deliberately created sacrificial surface which is removed given very high pressure gradients and resulting flow velocities in the constriction so that the constriction is thereby widened, and the pressure reduction is increased.

It is further proposed that the groove is conical at least in one section and constricts in the direction of the pressure chamber. Due to the conical shape and the alignment thereof, the gas flow in the groove is intentionally delayed in that the cross-sectional area of the groove is increased for the flow, and the flow velocity is reduced.

It is further proposed that at least one groove merges into at least one recess in the collar. The groove in the main body and the recess in the collar into which the groove merges thus form a single flow channel for the overflowing gas to reduce pressure on the pressure side. If a plurality of grooves and recesses are provided, a groove is arranged in such a way that it merges into a recess. Thus, a groove and a recess always form a flow channel.

BRIEF DESCRIPTION OF THE DRAWINGS

The invention is explained below using preferred embodiments with reference to the accompanying figures. They show.

DETAILED DESCRIPTION

Figure 1:
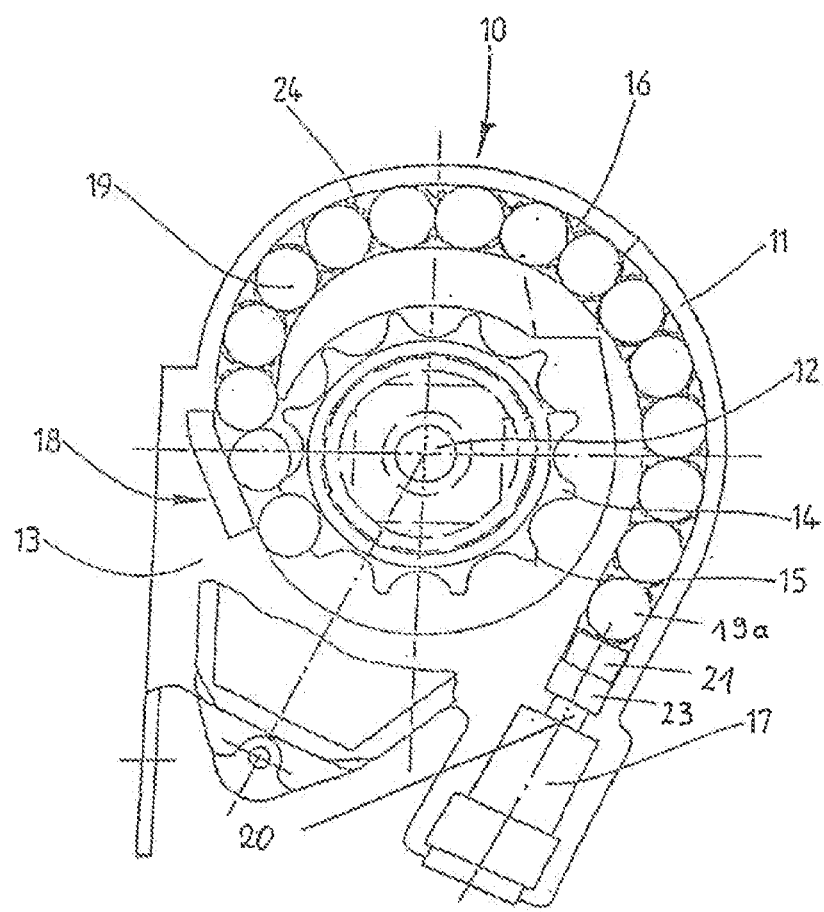
FIG. 1: a belt retractor with a pyrotechnic tightening device having a piston guided in a pipe.

The belt retractor shown schematically in FIG. 1 comprises a housing 11 with a side limb 13, a belt take-up shaft 12 mounted therein for a safety belt webbing, not shown, and a pyrotechnic tightening device 10 acting upon the belt take-up shaft 12 after deployment. The tightening device 10 comprises a drive wheel 14 which is connected in a rotationally fixed manner to the belt take-up shaft 12 and has, for example, external toothing 15, a pyrotechnic gas generator 17 for generating a gas pressure, and a pipe 16 connecting the gas generator 17 to the belt take-up shaft 12 via the drive wheel 14. The pipe 16 is formed by a pipe wall 24 which may be part of the housing 11 or alternatively may also be a separate component.

A force-transmitting device in the form of a series of metallic spherical mass bodies 19 is provided inside the pipe 16 and transmits the tightening movement to the belt take-up shaft 12 via a drive wheel 14. The belt retractor is not limited with regard to the design of the interaction area 18 between the mass body series 19 and the drive wheel 14 and any coupling devices between the drive wheel 14 and the belt take-up shaft 12. For low-friction force transmission, the external diameter of the mass bodies 19 is expediently somewhat smaller than the internal diameter of the pipe 16.

Furthermore, a piston 21 which is indicated only schematically in FIG. 1 is provided inside the pipe 16 and is expediently arranged in a region 23 between the gas generator 17 and the mass body series 19, that is to say, directly in front of the first mass body 19a of the mass body series 19 of the force-transmitting device in the force transmission direction.

The piston 21 closes a pressure chamber 20 inside the pipe 16 which can have gas pressure applied by a gas generator 17 so that the piston 21 can be driven into a tightening movement when pressure is applied to the pressure chamber 20 by the gas generator 17. The tightening movement of the piston 21 is transmitted to the belt take-up shaft 12 by the force-transmitting device formed by the mass bodies 19 and the drive wheel 14 so that the belt webbing is tightened.

Figure 2:
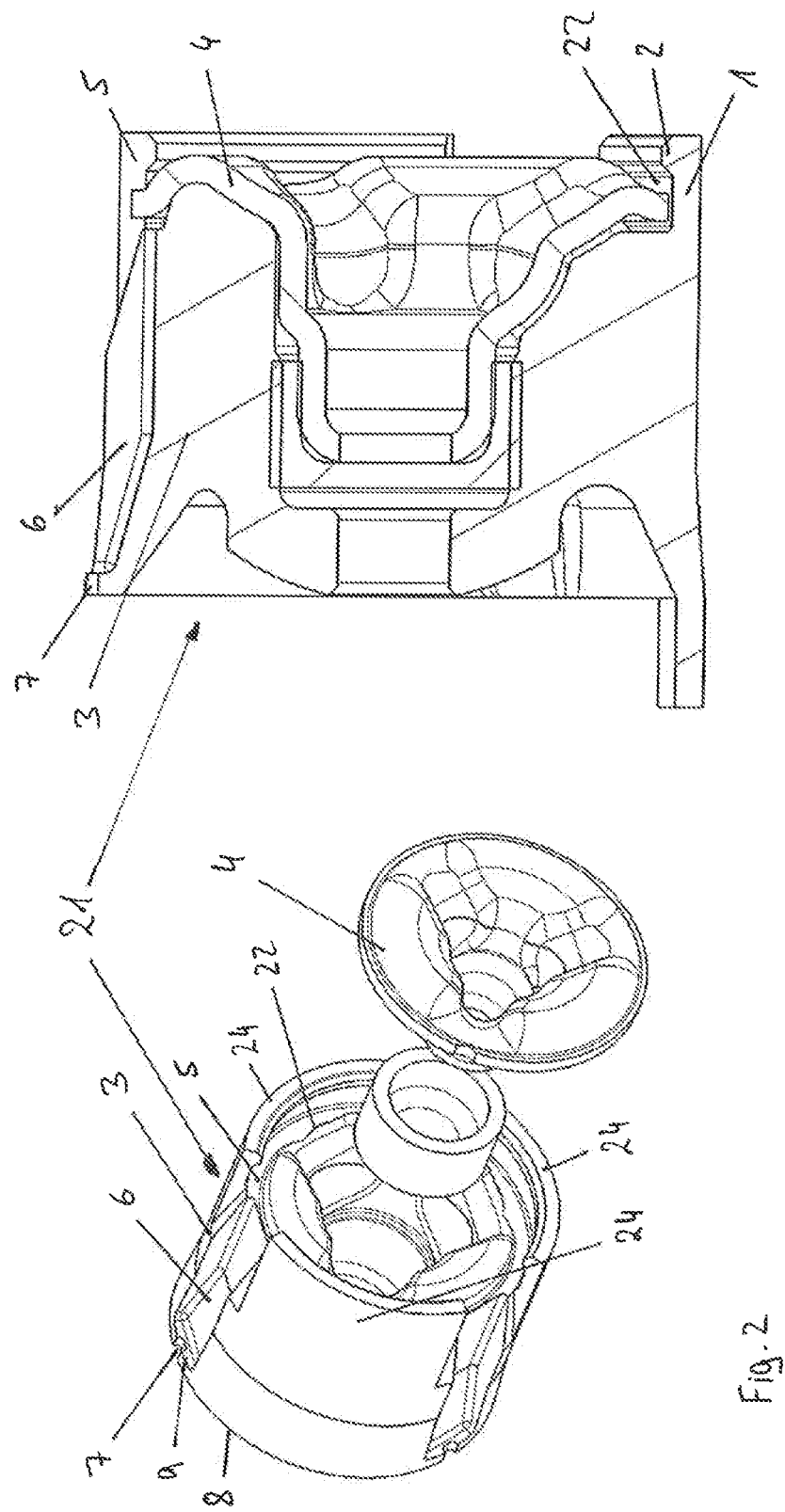
FIG. 2: a piston designed according to the invention in a sectional and exploded view.

FIG. 2 shows the piston 21 as a single part. The piston 21 is designed in two parts with a main body 3 and an contact part 4, wherein the main body 3 has, in principle, a lesser strength or a greater elasticity than the contact part 4 and serves to seal the pressure chamber 20 at the inner wall of the pipe 16 whereas the contact part 4, due to the greater strength, serves to contact the first mass body 19a and thus to transmit the drive movement to the mass body chain 19.

On its end face facing the mass body chain 19, the main body 3 has an annular, axially protruding collar 1 which, together with the end face of the main body 3, forms a seat 22 in which the contact part 4 is arranged. The collar 1 has a circumferential bead-like projection 2 projecting into the seat 22, which slightly reduces the opening width of the seat 22. Furthermore, the collar 1 has three recesses 5 which are arranged at an angle of 120° to one another and divide the collar 1 into three ring-segment-shaped sections 24 which are likewise arranged with their centers at 120° to one another.

In order to mount the contact part 4 in the seat 22 of the main body 3, the contact part 4 is pressed in by the end face, wherein the ring-segment-shaped sections 24 spring outwards slightly due to the elastic properties of the material of the main body 3, due to the separation of the collar 1 by the recesses 5, and finally due to their wall thickness. As a result, the opening cross section of the seat 22 is increased and the contact part 4 can be inserted. After insertion of the contact part 4, the sections 24 spring back again and the contact part 4 is held in a form-fit on the main body 3 or in the seat 22 by the projections 2 projecting radially inwards. As a result, the combination of the main body 3 and the contact part 4 is strengthened, and the contact part 4 is also securely held on the main body 3 in a curvature of the pipe 16. The collar 1 is dimensioned along the axial extension such that it either does not project beyond the contact part 4 or protrudes only to such an extent that the first mass body 19a exclusively abuts the contact part 4 during the drive movement.

The main body 3 furthermore has three grooves 6 extending in the axial direction of the main body 3 in its radially outer lateral surface, which grooves are arranged in such a way that they merge into the recesses 5 of the collar 1. The grooves 6 are each closed or constricted by webs 9 oriented in the circumferential direction transverse to the longitudinal extension of the grooves 6. A constriction 7 in the form of a small notch is provided in each of the webs 9 through which an overflow of the gas from the pressure chamber 20 to the side of the mass bodies 19 past the piston 21 is enabled. Pressure peaks in the pressure chamber 20 can be reduced by the constrictions 7 in the webs 9. The constrictions 7 are intentionally arranged in webs 9 which, on account of their slight wall thickness, erode as sacrificial points at very high flow velocities of the gas in the constrictions 7 so that the opening width of the constrictions 7 up to the maximum opening width of the grooves 6 can be increased with complete erosion of the webs 9.

The opening width of the grooves 6 is reduced stepwise to a very small opening width by the webs 9 and the constrictions 7 provided therein, so that the tightening power is reduced as little as possible. The constrictions 7 form very small openings, which allow a slight overflow of the gas past the piston 21, but are deliberately widened for the fastest possible pressure reduction when pressure peaks and the resulting very high flow velocities occur in the constrictions 7. In order to avoid the force-limiting interruption described at the outset, it is advantageous if the webs 9 are in each case completely eroded at the end of the tightening movement, so that the full cross section of the grooves 6 is available for the overflow of the gas.

Figure 3:
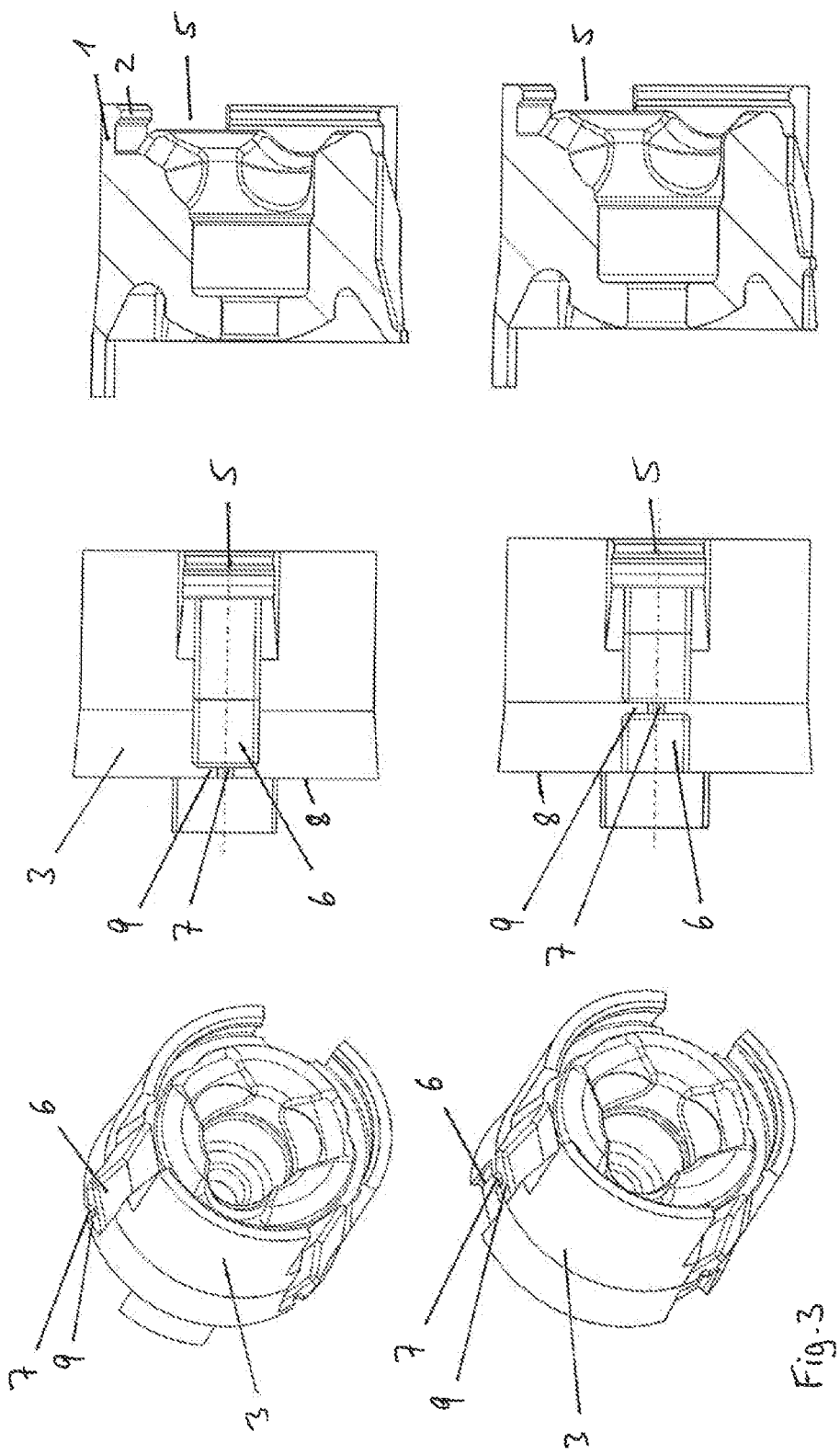
FIG. 3: a main body of the piston in two different embodiments.

Two different embodiments of the main body 3 can be seen in FIG. 3. In the top exemplary embodiment, the webs 9 with the constrictions 7 arranged therein are arranged directly on the edge side 8 of the main body 3 associated with the pressure chamber 20 so that they are directly exposed to the pressure in the pressure chamber 20. In the bottom exemplary embodiment, the webs 9 with the constrictions 7 provided therein are arranged in a central section of the grooves 6 so that a small antechamber is present in the grooves 6 between the pressure chamber 20 and the webs, in which the increasing pressure is deliberately built up when pressure peaks occur. The antechamber thus forms a type of nozzle in which the gas emerging from the pressure chamber 20 is initially pre-accelerated before it flows past the piston 21 through the constrictions 7. Furthermore, the overflowing gas is directed specifically toward the constrictions 7 by the antechamber formed in this way so that they are intentionally stressed and, if necessary, deliberately widened by erosion.

The invention claimed is:

1. A pyrotechnic tightening device for a safety belt of a safety belt unit having a force-limiting unit, comprising
a gas generator, and
a piston, which is guided in a pipe and which closes a pressure chamber inside the pipe, wherein
a pressure can be applied to the pressure chamber by the gas generator, and
the piston can be driven by the pressure present in the pressure chamber to perform a tightening movement which can be transmitted by means of a force-transmitting device to the safety belt, wherein
the piston is formed in two parts consisting of a main body and a contact part arranged on the side of the main body facing the force-transmitting device, wherein
the contact part has a greater strength than the main body, wherein
the main body encompasses the contact part in a form-fit at an end face facing the force-transmitting device, and wherein
the main body has an annular protruding collar having at least one projection that is directed radially inward and partially covers the end face of the contact part in an axial direction such that the annular protruding collar of the main body encompasses the contact part in the form-fit and the contact part is securely held on the main body.

2. The pyrotechnic tightening device according to claim 1, wherein the annular collar is interrupted in the circumferential direction by at least one recess.

3. The pyrotechnic tightening device according to claim 1, wherein the main body has, in a lateral surface, at least one groove aligned in the longitudinal direction of the piston and opens into the pressure chamber.

4. The pyrotechnic tightening device according to claim 3, wherein a constriction narrowing the cross-sectional area stepwise is provided in the groove.

5. The pyrotechnic tightening device according to claim 3, wherein
the constriction is arranged on an edge side of the main body adjacent to the pressure chamber.

6. The pyrotechnic tightening device according to claim 3, wherein
the constriction is arranged in a web which extends transversely to the groove and which closes the groove.

7. The pyrotechnic tightening device according to claim 3, wherein
the groove is designed conical at least in one section and constricts in the direction of the pressure chamber.

8. The pyrotechnic tightening device according to claim 2, wherein
at least one groove merges into the at least one recess of the collar.

* * * * *